No. 112,295.
L. STERNE.
RUBBER TIRE FOR STEAM CARRIAGES.
PATENTED FEB. 28, 1871.
2 SHEETS—SHEET 1.
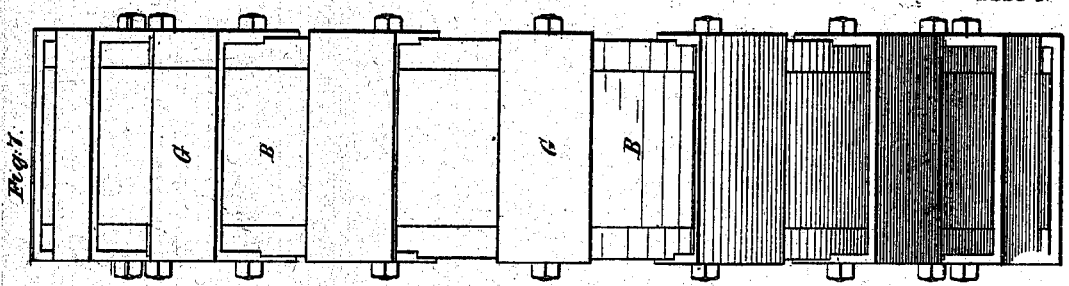
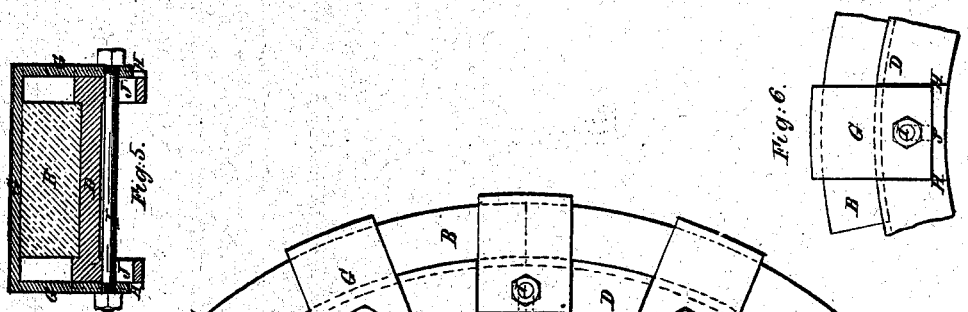
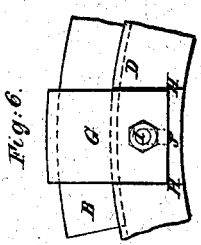
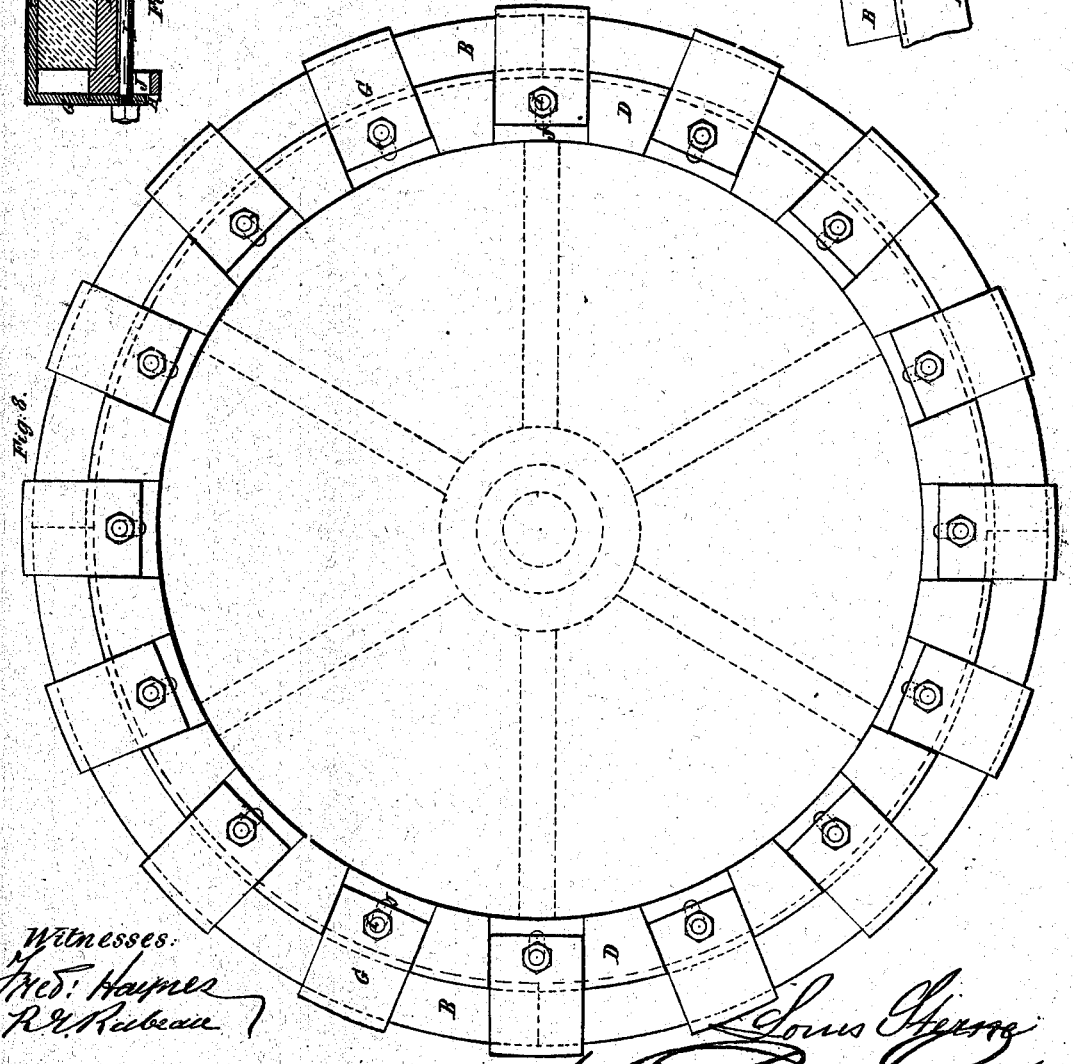

No. 112,295.  
L. STERNE.  
RUBBER TIRE FOR STEAM CARRIAGES.  
PATENTED FEB. 28, 1871.

Witnesses:
Fred. Haynes
R. E. Rabeau

Louis Sterne
per Brown Combs
Attorneys

United States Patent Office.

LOUIS STERNE, OF LONDON, ENGLAND.

Letters Patent No. 112,295, dated February 28, 1871.

---

IMPROVEMENT IN RUBBER TIRES FOR STEAM-CARRIAGES.

---

The Schedule referred to in these Letters Patent and making part of the same.

---

*To all whom it may concern:*

Be it known that I, LOUIS STERNE, of London, England, have invented or discovered certain new and useful "Improvements in the Construction of Wheel-Tires;" and I do hereby declare that the following is a full, clear, and exact description thereof, reference being had to the accompanying drawing and to the letters and figures marked thereon; that is to say—

My invention relates to the employment of vulcanized India rubber in the construction of wheel-tires, and My invention consists in forming tires of segmental blocks of India rubber, which have been chemically united in the process of vulcanization to segmental metal plates. The process of uniting is that described in the specification of my patent of February 23, 1869, No. 87,307.

These segmental plates, with their blocks of India rubber, are secured to the rim of the wheel in any convenient manner, and should any block become worn or otherwise injured, it can be readily removed, with the plate to which it is attached, and be replaced by a fresh block.

Or, instead of employing segmental blocks of India rubber which have been chemically united to segmental metal plates, I mold the segmental blocks of suitable form, and secure them to the rim of the wheel.

Figure 1:
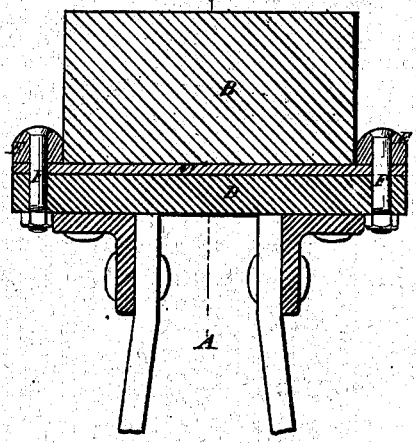
Figure 2:
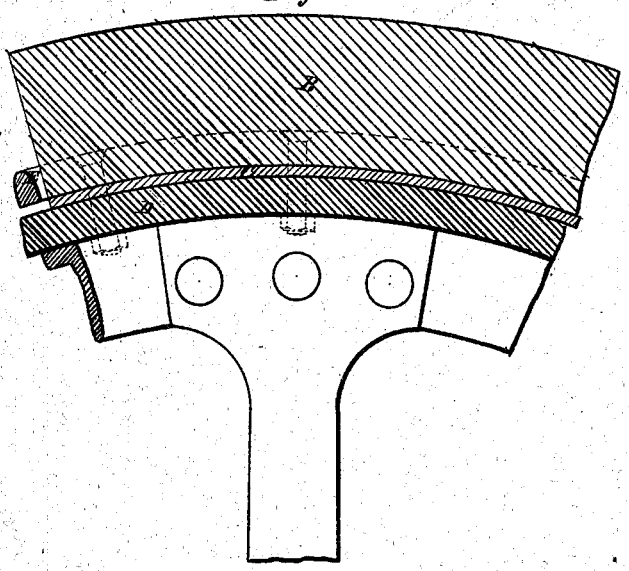

Figure 1 of the accompanying drawing is a transverse section of a part of a wheel, which is fitted with a tire constructed of segmental blocks of India rubber, according to my invention, and Figure 2 is a section through the line A A of fig. 1.

B B are the segmental blocks of India rubber.

Each of these blocks has been chemically united in the process of vulcanization to a segmental metal plate, C.

Sufficient of the plates C is left uncovered at each side to form flanges to receive the D-irons E E, which extend around the periphery of the wheel.

D is the rim of the wheel.

F F are screw-bolts, which are passed through the D-irons E, through the flanges of the plates C, and the rim D of the wheel, so as to secure the whole together.

The D-irons E E may conveniently be made in three or other suitable number of segments.

Figure 3:
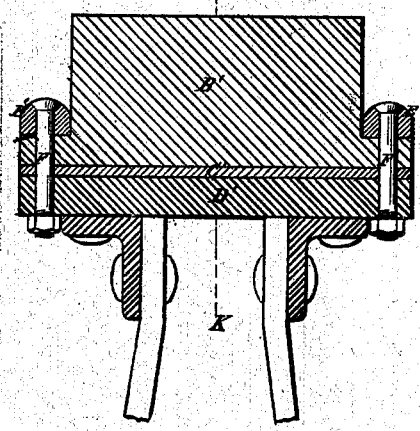
Figure 4:
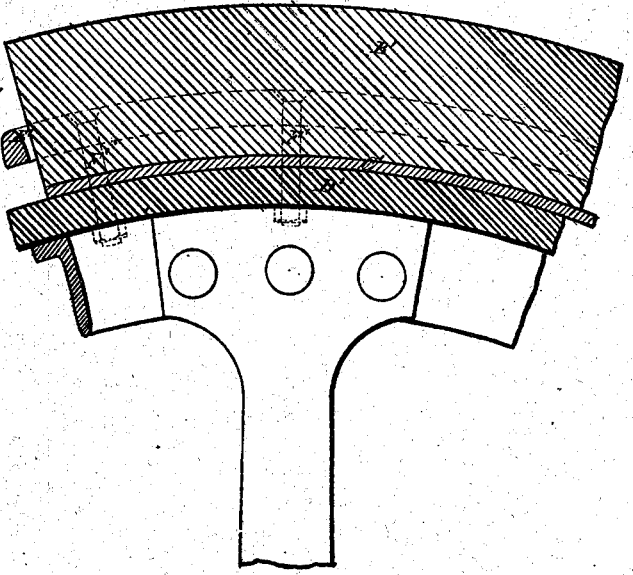

In Figures 3 and 4, I show the manner in which segmental blocks of India rubber may be secured to the rim of the wheel when the said blocks are not chemically united to metal plates.

B' B' are the segmental rubber blocks. They are molded with flanges, as shown.

Behind each block B' is a metal-plate C'.

D' is the rim of the wheel, and

E' E' are D-irons.

F' F' are screw-bolts, which are passed through the D-irons E, through the flanges of the blocks B', the plates C', and the rim D', so as to secure the whole together.

The form and arrangement shown in figs. 3 and 4 may also be adopted when the plates C' are chemically united in the process of vulcanization to the blocks B'.

Another mode of securing segmental blocks of India rubber to the rim of the wheel is shown in Figures 5 and 6.

According to this mode, the rubber blocks B are secured to the rim D by staples G, the two sides of which are respectively carried down the two sides of the elastic tire B, and of the metal rim D, which latter is formed with guides H to receive them. The sides of the staples are then connected together by a bolt or pin, I, which is free to work in slots J.

When the portions of the tire to which these staples are fitted yield under the pressure of the weight of the carriage, the staples slide or move inward.

Figures 7 and 8 show a complete wheel provided with these sliding staples.

Sometimes, instead of sliding staples I use sliding bolts, provided with broad heads or plates of the width of the elastic tire. These bolts I carry radially through the blocks B and rim D, and secure their inner ends by nuts or otherwise.

The sliding staples or sliding bolts will also be found an additional security for segmental rubber blocks which have been chemically united to metal plates as first herein described, in case such blocks should become loose.

The sliding staples or bolts may also be employed to secure elastic tires made of complete rings or bands.

What I claim, and desire to secure by Letters Patent, is—

1. A wheel-tire, constructed of segmental blocks of India rubber, and secured to the rim of the wheel as shown in figs. 1 to 4, and herein described.

2. In combination with the rubber tire B and rim D of the wheel, the staples G, secured by bolts having a sliding motion in a radial direction, in suitable guide-ways H H, substantially as herein shown and described.

In witness whereof I, the said LOUIS STERNE have hereunto set my hand this twenty-second day of September, one thousand eight hundred and seventy.

LOUIS STERNE.

Witnesses:
W. P. TOWNSEND,
W. T. PARBACK.